W. H. H. STINEMAN.
FENDER FOR SELF PROPELLED VEHICLES.
APPLICATION FILED MAY 4, 1917.

1,292,130.

Patented Jan. 21, 1919.
2 SHEETS—SHEET 1.

WITNESS:
George S. Goet

INVENTOR.
William H. H. Stineman

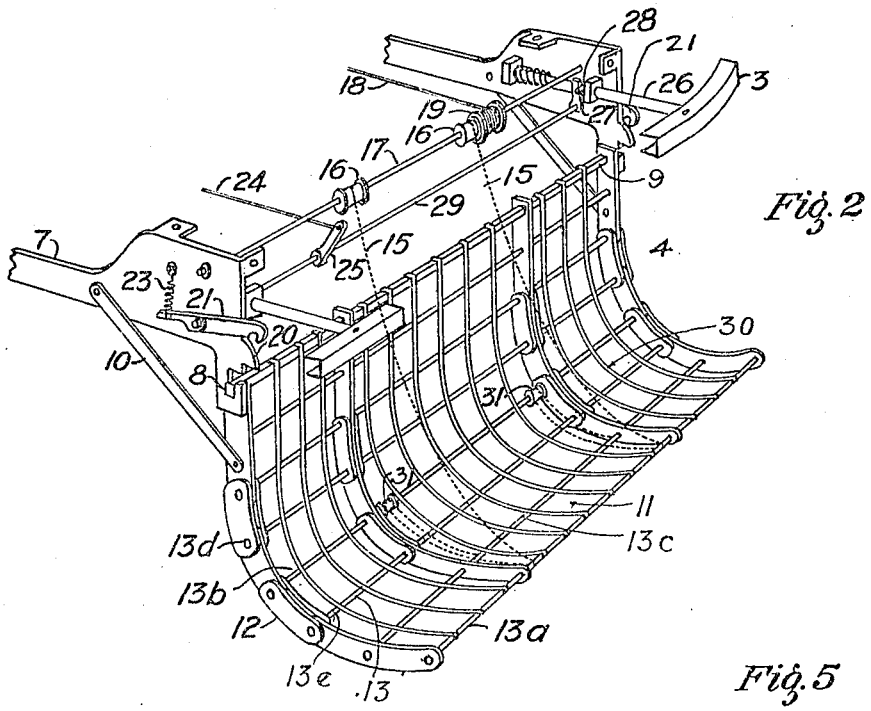
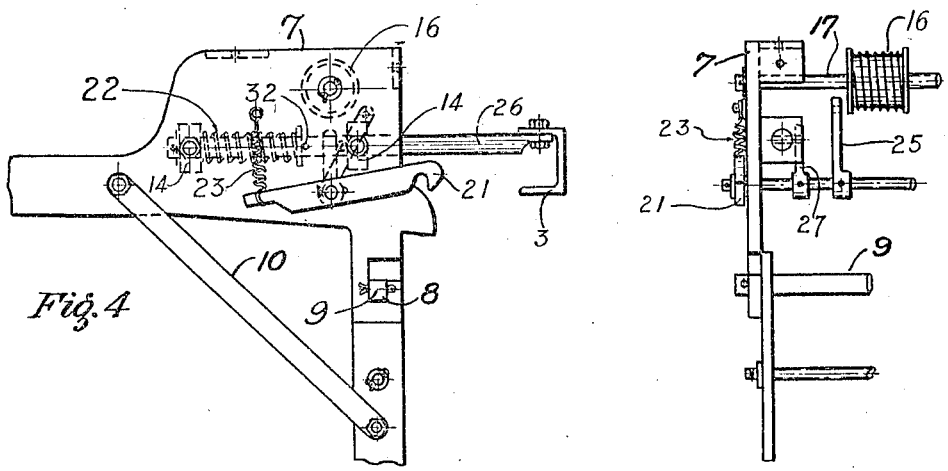

UNITED STATES PATENT OFFICE.

WILLIAM H. H. STINEMAN, OF BALTIMORE, MARYLAND.

FENDER FOR SELF-PROPELLED VEHICLES.

1,292,130.  Specification of Letters Patent.  Patented Jan. 21, 1919.

Application filed May 4, 1917. Serial No. 166,501.

*To all whom it may concern:*

Be it known that I, WILLIAM H. H. STINEMAN, a citizen of the United States, residing at Baltimore, in the county of Baltimore and State of Maryland, have invented certain new and useful Improvements in Fenders for Self-Propelled Vehicles, of which the following is a specification.

My invention relates to fenders for self-propelled vehicles.

The object of my invention is to provide a fender especially adapted for use with a self-propelled vehicle such as an automobile, or a street car, said fender being so constructed that it is folded in a small space when not in process of operation.

In carrying out my invention I make use of the instrumentalities illustrated in the drawings in which:—

Fig. 2, is a perspective view showing the front of the fender when extended for use.

Fig. 4, is an end view of operating parts of the fender to wit: the latch, buffer-rod and spring, resetting spools on shaft and tripper, and also showing manner of attaching the cradle to bracket extending from chassis.

Fig. 5, is a fragmentary view from the front showing operating parts and showing particularly the tripper on which the bumper-rod pin operates to release the latch and also the tripper which is operated from the inside of the car. The resetting spool is likewise shown in this figure.

Figure 1:
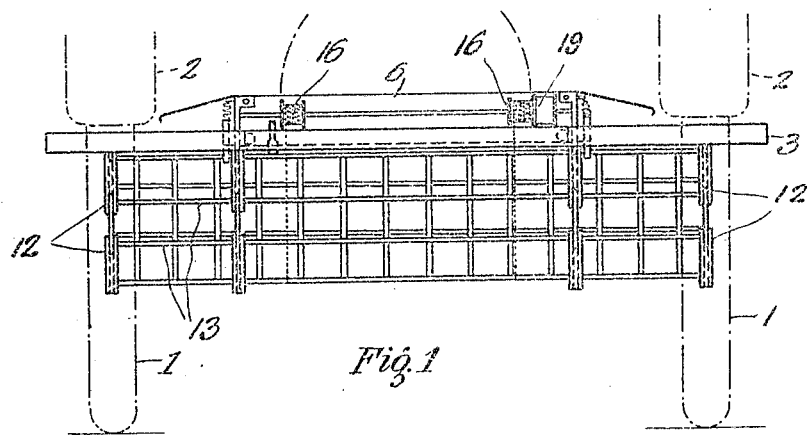
Figure 1, shows a front view of the fender in its folded position.

In the drawings 1 represents automobile wheels, 2 the front wheel mud guards, 3 the bumper, 4 the fender, and 6 the cover over the operating parts.

The fender is attached to the chassis of the car by any suitable brackets or clips acting upon the arms 7, into which the square bar 9, which forms upper support of the cradle 11, fits at 8. Braces 10 furnish the rigidity for the cradle 11.

The cradle is made with a plurality of links 12, held together by rods 13, which are riveted or burred at each end. These links fold within in a small space as shown in Fig. 1, by means of a cable or chain operating upon spools 16, on shaft 17; these spools being caused to revolve by pulling upon the cable or chain 18, leading to inside of car and acting upon spool 19. I call this folding operation the "resetting" of the fender and the action of the fender in folding or resetting and the contrivances and mechanisms used to bring it about are as follows:—

Figure 3:
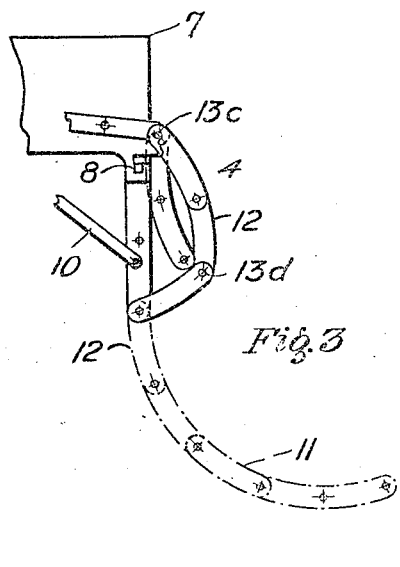
Fig. 3, is a sectional view showing the manner in which the fender folds and also shows in dotted lines the manner in which it opens for use.
Figure 6:
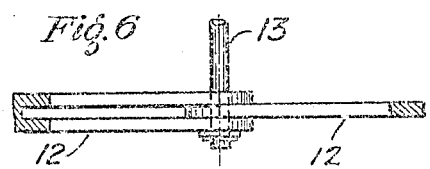
Fig. 6, is a detailed front view of the knee joints in the links which form the fender frame.
Figure 7:
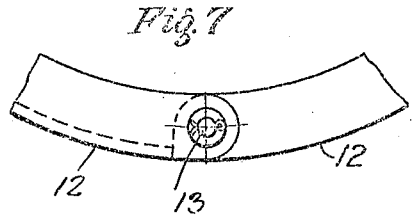
Fig. 7, is an end view of Fig. 6.

As shown in Fig. 2 cables or chains 15 are made fast by screws or rivets to spools 16 and operate in screw-like grooves to avoid riding, thereby maintaining regular pull and even length to the cable or chain, and raising the cradle uniformly along its entire width so that both latches 21, catch rod 13$^e$ at the same instant. The cables or chains 15, are drawn over and under the lowest cross-rod 13$^a$, thence under the cradle and over spools 31, on cross-rod 13$^b$, which is the fourth rod from the bottom of the cradle; thence on the upper side of the cradle to cross-rod 13$^c$, to which it is permanently attached. When the spools 16 are caused to revolve in counterclockwise direction by spool 19, cross-rod 13$^a$ is pulled upward against the tension of springs 11, until it rests against cross-rod 13$^d$, and then the pull acts directly upon spools 31 and draws cross-rod 13$^e$, as shown most clearly in Fig. 3, upon and against seat 20, where latches 21 catch and hold said cross-rod as shown in Fig. 1.

The cradle when brought up to its folded position, as shown in Fig. 1, rests upon seats 20, which being beveled facilitate its latching and unlatching. Latches 21 catch rod 13$^e$, and are held down by springs 23. These latches are operated so as to release cradle from within the car by means of the foot pedal which pulls the rod 24 and tripper 25, attached to that rod. These latches are also raised by pressure against buffer 3, which pushes buffer-rod 26 and forces trigger 27 on rod 29 backward by means of the buffer-rod pin 28. The buffer is kept in its regular position by springs 22 around buffer-rod 26; these springs constantly operating against the buffer-rod 14 on the end next to the car and against pins 32 through the buffer-rod at its other end. The fender is fitted with blue-steel spring ribbon or spring brass ribbon 30. It serves the double purpose of forming the mesh for the framework of the cradle and furnishes strong tension which causes the cradle to instantly unfold when unlatched.

I claim:—

1. In a structure of the character set forth, the combination with a support, of a foldable fender mounted thereon and having its front end rotatable and inclosed within the body of the fender when in folded position.

2. In a structure of the character set forth, the combination with a support, of a foldable flexible fender fixed at one end to the support and having its other end free to turn back against the body of the fender and be wrapped about thereby when folded.

3. In a structure of the character set forth, the combination with a support, of a flexible foldable fender comprising sets of pivotally connected links and a flexible body carried by the links, and means for securing the upper links of the sets to the support, the lower of the links of said sets folding back upon the intermediate links and being inclosed thereby when the fender is rolled upon itself, said fender unrolling when projected.

4. In a structure of the character set forth, the combination with a support, of a foldable flexible fender fixed at one end to the support and having its other end free to turn back against the body of the fender and be wrapped about thereby when folded, means for holding the fender in folded condition, and means for unrolling the fender when released from the holding means.

5. In a structure of the character set forth, the combination with a support, of a flexible foldable fender comprising sets of pivotally connected links and a flexible body carried by the links, means for securing the upper links of the sets to the support, the lower of the links of said sets folding back upon the intermediate links and being inclosed thereby when the fender is rolled upon itself, said fender unrolling when projected, and latch mechanism for holding the fender in rolled condition, said fender including spring members for automatically unrolling and projecting the fender when released from the latch mechanism.

6. In a structure of the character set forth, the combination with a support, of a flexible fender body mounted thereon and adapted to be rolled into folded condition, said body including spring means that are coiled when the body is rolled and automatically uncoiled to unroll and project said body.

7. In a structure of the character set forth, the combination with a support, of a flexible fender body mounted at one end thereon and having its other end free, said body being adapted to be rolled into folded condition and including leaf springs extending between its secured and free ends, said springs being coiled when the body is rolled and automatically uncoiling to unroll and project said body.

8. In a structure of the character set forth, the combination with a support, of sets of links secured at one end to the support and foldable upon each other, pivots connecting the corresponding links of the different sets, and leaf springs disposed transversely of the pivots and substantially parallel to the links, said springs being folded with the links and constituting means for automatically extending the structure.

9. In a structure of the character set forth, the combination with a support, of a flexible fender body mounted thereon and adapted to be rolled into folded condition, said body including spring means that are coiled when the body is rolled and automatically uncoiled to unroll and project said body, and means for securing the fender body in folded condition.

10. In a structure of the character set forth, the combination with a support, of sets of links secured at one end to the support and foldable upon each other, pivots connecting the corresponding links of the different sets, leaf springs disposed transversely of the pivots and substantially parallel to the links, said springs being folded with the links and constituting means for automatically extending the structure, and latch mechanism for holding the fender body in folded condition.

11. In a structure of the character set forth, the combination with a support, of a foldable fender mounted thereon and extensible with respect thereto, means for automatically extending the fender, and means for folding it, comprising a rotatable spool element, a cable connected to the fender and adapted to be wrapped upon the spool element, and means for rotating the spool element.

12. In a structure of the character set forth, the combination with a support, of a foldable fender mounted thereon and extensible with respect thereto, means for automatically extending the fender, and means for folding it, comprising a rotatable spool element, a cable connected to the fender and adapted to be wrapped upon the spool element, another spool element connected to the first spool element, and an operating cable wrapped upon the second spool element and adapted to rotate the same when tension is applied to said latter cable.

13. In a structure of the character set forth, the combination with a support, of a flexible fender body mounted thereon and adapted to be rolled into folded condition, said body including spring means that are coiled when the body is rolled and automatically uncoiled to unroll and project said body, a cable connected to the free portion of the fender body and extending about the free end thereof, a spool element upon which the cable is wrapped, and means for rotating said spool element.

14. In a structure of the character set forth, the combination with spaced arms, of means for securing the same to the chassis of an automobile, said arms having seats formed in their front ends, a foldable fender including a cross bar detachably engaged in the seats and adapted to be rolled upon itself to a folded position adjacent to the front ends of the arms, latch mechanism for securing the fender in folded condition, said latch mechanism being mounted on the arms, means also mounted on the arms for rolling the fender to said folded position, and extensible springs carried by the fender and automatically extending the same when the fender is released from the latch mechanism.

WILLIAM H. H. STINEMAN.

Copies of this patent may be obtained for five cents each, by addressing the "Commissioner of Patents, Washington, D. C."